United States Patent
Flosbach et al.

(10) Patent No.: US 6,332,291 B1
(45) Date of Patent: Dec. 25, 2001

(54) RADIATION-CURABLE COATINGS AND THEIR USE

(75) Inventors: Carmen Flosbach, Wuppertal; Helmut Löffler, Brühl; Karin Maag, Inzlingen, all of (DE)

(73) Assignee: Herberts GmbH & Co. KG, Wuppertal (DE)

( * ) Notice: Subject to any disclaimer, the term of this patent is extended or adjusted under 35 U.S.C. 154(b) by 0 days.

(21) Appl. No.: 09/446,074

(22) PCT Filed: Apr. 22, 1999

(86) PCT No.: PCT/EP99/02780

§ 371 Date: Dec. 17, 1999

§ 102(e) Date: Dec. 17, 1999

(87) PCT Pub. No.: WO99/55785

PCT Pub. Date: Nov. 4, 1999

(30) Foreign Application Priority Data

Apr. 27, 1998 (DE) .............................. 198 18 735

(51) Int. Cl.$^7$ ................. C08F 2/50; C08J 3/28; C09D 163/10; C09D 167/07; C09D 175/16; C09D 183/07; C09D 133/04

(52) U.S. Cl. ............... 52/91; 522/92; 522/93; 522/95; 522/97; 522/100; 522/101; 522/102; 522/104; 522/106; 522/90; 522/91; 522/79; 522/81; 522/83; 522/84; 522/85; 522/86

(58) Field of Search .................... 522/170, 173, 522/174, 175, 178, 179, 182, 92, 81, 83, 79, 84, 85, 86, 90, 91, 93, 95, 96, 100, 103, 104, 107

(56) References Cited

U.S. PATENT DOCUMENTS

| | | |
|---|---|---|
| 4,668,529 | 5/1987 | Blair .................... 427/54.1 |
| 4,820,745 | 4/1989 | Muller et al. ............ 522/90 |
| 4,822,829 | 4/1989 | Muller et al. ............ 522/90 |
| 4,851,460 | 7/1989 | Stranghöner et al. ....... 523/407 |
| 5,932,282 | 8/1999 | Diener et al. ............ 427/140 |

FOREIGN PATENT DOCUMENTS

| | | |
|---|---|---|
| 28 09 715 | 3/1978 | (DE) . |
| 36 13 082 | 11/1986 | (DE) . |
| 36 28 124 | 3/1988 | (DE) . |
| 196 35 447 | 8/1996 | (DE) . |
| 197 09 560 | 3/1997 | (DE) . |
| 0 000 407 | 1/1979 | (EP) . |
| 1 575 895 | 10/1980 | (GB) . |
| 96/11217 | 4/1996 | (WO) . |
| 98/00456 | 1/1998 | (WO) . |

*Primary Examiner*—Susan W. Berman
(74) *Attorney, Agent, or Firm*—Pillsbury Winthrop LLP

(57) ABSTRACT

This invention relates to radiation-curable coating compositions which contain

A) compounds having one or more free-radically polymerisable double bonds which additionally contain at least one further functional group reactive for the purposes of an addition and/or condensation reaction, B) compounds having one or more free-radically polymerisable double bonds, which additionally contain at least one further functional group reactive for the purposes of an addition and/or condensation reaction, wherein the additional reactive functional group is complementary to or reactive towards the additional reactive functional groups of component A), C) optionally at least one monomeric, oligomeric and/or polymeric compound having at least one functional group reactive towards the functional groups from component A) or component B)

D) one or more photoinitiators as well as

E) optionally solvents, water, pigments and/or extenders as well as conventional lacquer additives, wherein component A) and component B) differ from each other and component C) contains no free-radically polymerisable double bonds. The coating compositions are useful for the production of multilayer lacquer coatings, in particular automotive repair lacquer coating.

9 Claims, No Drawings

RADIATION-CURABLE COATINGS AND THEIR USE

This application is the national phase of international application PCT/EP99/02780 filed Apr. 22, 1999 which designated the U.S.

This invention relates to coating compositions curable by means of high-energy radiation and to the use of the coating compositions for multilayer lacquer coating in the automotive lacquer coating sector, in particular for automotive repair lacquer coating.

It is already known to use coating compositions curable by means of high-energy radiation in automotive lacquer coating. This application also exploits the advantages of radiation-curable coating compositions, such as for example very short curing times, low solvent emissions from the coating composition and the good hardness of the coatings obtained therefrom.

DE-A-196 35 447 accordingly describes a process for the production of a multilayer repair lacquer coating, wherein a coating composition solely containing binders which are free-radically polymerisable by UV radiation is applied as the clear lacquer or pigmented topcoat lacquer.

EP-A-0 000 407 describes radiation-curable coating compositions based on an OH-functional polyester resin esterified with acrylic acid, a vinyl compound, a photoinitiator and a polyisocyanate.

U.S. Pat. No. 4,668,529 furthermore describes a single component surface coating composition for repair lacquer coating which is curable by UV radiation. The UV-curable binder components used are tripropylene glycol diacrylate and trimethylolpropane triacrylate. An epoxy resin based on a bisphenol A diglycidyl ether is additionally present.

The as yet unpublished German patent application P 197 09 560 describes a clear lacquer coating composition for automotive lacquer coating, which contains binders curable by means of high-energy radiation and additionally a binder system curable by addition and/or condensation reactions which contains no free-radically polymerisable double bonds.

WO-A-98/00456 furthermore discloses a binder system which contains OH—, $NH_2$—, COOH—, NCO— or epoxy-functional compounds having at least one free-radically polymerisable olefinic double bond, photoinitiators and a binder system based on polyacrylate polyol and/or polyester polyol with melamine resin or with optionally blocked polyisocyanates or based on carboxyl-, anhydride- or amino-functional polyesters and/or polyacrylates with epoxy-functional polyesters and/or polyacrylates.

DE-A-28 09 715 describes binders curable by means of high-energy radiation based on an NCO-functional urethane compound produced from a hydroxyalkyl ester of (meth) acrylic acid and a polyisocyanate, and based on a polyfunctional hydroxyl compound.

The stated prior art coating compositions curable by means of high-energy radiation or the coating compositions formulated therefrom yield coatings which in many respects are still in need of improvement. The coatings exhibit weaknesses with regard to scratch resistance, solvent and chemical resistance and sandability. They do not in every respect fulfil the requirements placed upon a multilayer structure in automotive lacquer coating, in particular in automotive repair lacquer coating. In particular, the curing process in coating compositions curable by high-energy radiation brings about a shrinkage in volume of the applied coating, which results in stresses and cracking in the film. The coating becomes detached from the substrate. While the problem of cracking may indeed be reduced with known coating compositions which, in addition to the radiation curable binders, contain further chemically crosslinking binder components, no satisfactory solution has hitherto been found with regard to cracking and inadequate interlayer adhesion.

The object of the invention was to provide coating compositions based on binders curable by means of high-energy radiation for the production of a multilayer lacquer coating, which yield coatings having very good resistance to chemicals, petrol and solvents, elevated scratch resistance together with good and rapid sandability and which, with respect to these properties, fulfil the requirements placed on a multilayer lacquer coating for automotive lacquer coating applications, in particular for repair automotive lacquer coating. The coatings should moreover exhibit no cracking and have good adhesion to the substrate. They should also be optically faultless in appearance.

This object is achieved by a coating composition curable by means of high-energy radiation containing A) compounds having one or more free-radically polymerisable double bonds which additionally contain at least one further functional group reactive for the purposes of an addition and/or condensation reaction, B) compounds having one or more free-radically polymerisable double bonds, which additionally contain at least one further functional group reactive for the purposes of an addition and/or condensation reaction, wherein the additional reactive functional group is complementary to or reactive towards the additional reactive functional groups of component A), C) optionally at least one monomeric, oligomeric and/or polymeric compound having at least one functional group reactive for the purposes of an addition and/or condensation reaction towards the functional groups from component A) or component B) which are present in addition to the free-radically polymerisable double bonds, D) one or more photoinitiators as well as E) optionally solvents, water, pigments and/or extenders as well as conventional lacquer additives.

The coating compositions according to the invention are based on a combined crosslinking mechanism comprising free-radical polymerisation initiated by means of high-energy radiation and a further crosslinking reaction via an addition and/or condensation reaction. In addition to the groups containing free-radically polymerisable double bonds, the binders curable by means of high-energy radiation accordingly bear additional groups reactive for the purposes of an addition and/or condensation reaction. Component B) here bears the groups which are complementary to or reactive towards component A). Various different functional groups may in each case be present in one component, providing that they are compatible.

Component C) provides a further reactive component which contains functional groups reactive for the purposes of an addition and/or condensation reaction, which groups can react with the functional groups additionally present in component A) or B), in addition to the free-radically polymerisable double bonds. Component C) contains no free-radically polymerisable double bonds.

The functional groups of components A), B) and C) which are reactive for the purposes of an addition and/or condensation reaction must be selected such that they are not reactive with the groups bearing polymerisable double bonds of components A) and B).

The functional groups of components A), B) and C) which are reactive for the purposes of an addition and/or condensation reaction may comprise hydroxyl, isocyanate, amino, anhydride, carboxyl or epoxide groups. Due to the reactivity of amino groups with free-radically polymerisable double bonds in the form of (meth)acryloyl groups, amino groups must be present in blocked form, for example blocked with ketones or aldehydes.

Component A) of the coating compositions according to the invention comprises compounds having one or more free-radically polymerisable double bonds. The free-radically polymerisable double bonds are preferably present in the form of (meth)acryloyl groups. (Meth)acryloyl and (meth)acrylic mean here and below acryloyl and/or methacryloyl and acrylic and/or methacrylic respectively. The molecule preferably contains at least two polymerisable double bonds in the form of (meth)acryloyl groups, for example 2 to 20, preferably 2 to 10 (meth)acryloyl groups.

Component A) may comprise (meth)acryloyl-functional oligomers and/or polymeric compounds based on poly (meth)acrylate, polyurethane, polyester, polyesterurethane and/or epoxy resin. The number average molecular weight of these compounds may be for example 300 to 10000, preferably 800 to 10000. The (meth)acryloyl-functional compounds contain at least one further functional group reactive for the purposes of an addition and/or condensation reaction. The reactive functional group may be selected from among a hydroxyl, isocyanate, epoxide, anhydride, carboxyl or a blocked amino group.

The reactive groups particularly preferably comprise hydroxyl or isocyanate groups. If hydroxy-functional compounds containing (meth)acryloyl groups are used as component A), these compounds may, for example, have an OH value of 20 to 200, preferably of 30 to 150. If isocyanate-functional compounds containing (meth)acryloyl groups are used as component A), these compounds may have an NCO content of, for example, 2–30 wt. %.

The component A) compounds preferably containing free-radically polymerisable double bonds in the form of (meth)acryloyl groups may be obtained by conventional methods, for example by reacting di- or polyepoxides, glycidyl-functional polyesters, polyurethanes and/or poly (meth)acrylates with (meth)acrylic acid. These and further production methods are described in the literature and are known to the person skilled in the art.

(Meth)acryloyl-functional poly(meth)acrylates may, for example, be produced from glycidyl-functional poly(meth) acrylates by reaction with (meth)acrylic acid with opening of the oxirane ring.

According to the invention, the (meth)acryloyl-functional poly(meth)acrylates should contain further reactive functional groups. These groups preferably comprise hydroxyl or isocyanate groups. The poly(meth)acrylates produced as described above already contain hydroxyl groups, which have arisen on opening of the oxirane ring.

Another possibility for introducing hydroxyl groups into the (meth)acryloyl-functional poly(meth)acrylates is to use hydroxy-functional poly(meth)acrylates as the starting products and to esterify the hydroxyl groups with (meth)acrylic acid or to transesterify them with (meth)acrylic acid alkyl esters, such as for example (meth)acrylic acid methyl, ethyl or propyl esters, specifically in such stoichiometric quantities that free hydroxyl groups are still present in the final product. Using this production method, hydroxyl and (meth) acryloyl groups are thus present in the final product.

If the (meth)acryloyl-functional poly(meth)acrylates are to contain isocyanate groups, it is possible to react the hydroxyl groups which have arisen during production by opening of the oxirane ring or by copolymerisation with hydroxy-functional (meth)acrylates with an excess of polyisocyanates, preferably with diisocyanates. Diisocyanates which may be used are any organic aromatic, aliphatic and/or cycloaliphatic diisocyanates individually or in combination. The diisocyanates may, for example, comprise sterically hindered diisocyanates and diisocyanates containing ether or ester groups. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 1-isocyanatomethyl-5-isocyanato-1,3,3-trimethylcyclohexane, bis-(4-isocyanatocyclohexyl) methane, bis-(4-isocyanatophenyl)methane, norbornene diisocyanate, 4,4-diisocyanatodiphenyl ether, 1,5-dibutylpentamethylene diisocyanate, tetramethylxylylene diisocyanate, 2,3-bis-(8-isocyanatooctyl)-4-octyl-5-hexylcyclohexane, 3(4)-isocyanatomethyl-1-methylcyclohexyl isocyanate and/or 2,6-diisocyanatomethyl caproate.

Aliphatic and/or cycloaliphatic diisocyanates having 4 to 25, preferably 6 to 16 C atoms are preferably used, which contain one or two linear, branched or cyclic alkyl groups having 1 to 12, preferably 1 to 4 C atoms in alpha position relative to the NCO group. The parent structure may consist of an aromatic or alicyclic ring or of an aliphatic linear or branched C chain having 1 to 12 C atoms. Examples of these are isophorone diisocyanate, bis-(4-isocyanatocyclohexyl) methane, 1,1,6,6-tetramethyl-hexamethylene diisocyanate, 1,5-dibutylpentamethylene diisocyanate, 3(4)-isocyanatomethyl-1-methylcyclohexyl isocyanate, p- and m-tetramethylxylylene diisocyanate and/or the corresponding hydrogenated homologues. It is, however, also possible to use more highly functional isocyanates instead of the diisocyanates. The derivatives containing biuret, isocyanurate or urethane groups of the above-stated diisocyanates may, for example, be used.

(Meth)acryloyl-functional oligomeric and/or polymeric urethane compounds having at least one further functional group reactive for the purposes of an addition and/or condensation reaction may also be used as component A). These polyurethanes are produced in the conventional manner known to the person skilled in the art. They may, for example, be obtained by firstly producing (meth)acryloyl-functional polyurethanes in the conventional manner, for example by reacting polyols with polyisocyanates and hydroxy-functional (meth)acrylic acid esters. The polyols comprise, for example, the conventional polyhydroxy compounds usable for the production of polyurethanes. Examples of such polyols are polyester, polyurethane, polyesterurethane, polyacrylate, polyether and polycarbonate polyols. Low molecular weight polyhydric alcohols, for example having a molecular weight of 60 to 400, may also be used as the polyols. Examples of these are 1,4-butanediol, 1,6-pentanediol, 1,6-hexanediol, neopentyl glycol, trimethylolpropane.

Examples of suitable diisocyanates have already been stated above. Examples of hydroxy-functional (meth)acrylic acid esters are hydroxymethyl (meth)acrylate, hydroxyethyl (meth)acrylate, hydroxypropyl (meth)acrylate and butanediol monoacrylate.

(Meth)acryloyl-functional urethane compounds which comprise reaction products of polyisocyanates and hydroxy-functional (meth)acrylic acid esters may also be used as component A).

There are various options for providing the (meth)acryloyl-functional polyurethanes with further functional groups. Hydroxyl groups may be introduced, for example, by using the above-stated starting products, polyisocyanate, polyol and hydroxy-functional (meth)acrylic acid esters, in quantities such that an excess of hydroxyl groups is present. The quantity of hydroxyl components to be used should then be calculated such that the desired hydroxyl value is achieved. The polyisocyanates may furthermore, for example, be reacted with an excess of polyols and then this OH-functional polyurethane prepolymer is esterified with (meth)acrylic acid or transesterified with (meth)acrylic acid esters, specifically in a ratio such that hydroxyl groups are still present in the final product.

It is, in general, also possible to start from glycidyl-functional polyurethanes and to react the glycidyl groups with (meth)acrylic acid. The desired hydroxyl groups then arise on ring opening of the oxirane group.

Isocyanate groups may be introduced into the (meth)acryloyl-functional polyurethanes by, for example, using polyisocyanate, polyol and hydroxy-functional (meth)acrylic acid esters in quantities such that free isocyanate groups are still present in the final product. It is thus possible to react polyol with excess polyisocyanate and then to react a proportion of the isocyanate groups still present with hydroxy-functional (meth)acrylic acid esters. It is furthermore possible to react hydroxy-functional (meth)acrylic acid esters with polyisocyanates to yield urethane compounds containing NCO. (Meth)acryloyl-functional polyesters having at least one further functional group reactive for the purposes of an addition and/or condensation reaction are also suitable as component A). The functionalised polyesters may be produced by polycondensation in the conventional manner known to the person skilled in the art. For example, conventional polyols, conventional polycarboxylic acids or the anhydrides thereof and (meth)acrylic acid which are suitable for polyester production may be reacted together. The quantity of (meth)acrylic acid must here be selected such that the desired proportion of (meth)acryloyl groups is present in the final product. Another possible production method comprises producing OH-functional polyesters in the conventional manner from polyols and polycarboxylic acids, preferably from diols and dicarboxylic acids, and then esterifying the hydroxyl groups with (meth)acrylic acid or transesterifying them with (meth)acrylic acid esters. It is furthermore possible to start from glycidyl-functional polyesters and to react the glycidyl groups with (meth)acrylic acid. The polyesters then already contain hydroxyl groups.

If the (meth)acryloyl-functional polyesters are to contain hydroxyl groups, this may also be achieved by means of an appropriate selection of the OH/COOH equivalent ratio during esterification. The hydroxyl groups must then be present in excess. If the (meth)acryloyl-functional polyesters are to contain isocyanate groups, the OH— and (meth)acryloyl-functional polyesters described above may be reacted with excess polyisocyanates, preferably diisocyanates.

(Meth)acryloyl-functional epoxide compounds may also be used as component A). These epoxide compounds may be produced in the conventional manner known to the person skilled in the art. They may, for example, be obtained by addition of (meth)acrylic acid onto polyepoxides.

Polyepoxides which may be considered here are, for example, conventional aromatic epoxide compounds based on bisphenol A as well as further aliphatic and cycloaliphatic epoxide compounds. The epoxide compounds preferably have an equivalent weight of at most 1000. The (meth)acryloyl-functional epoxides produced in this manner contain hydroxyl groups which have arisen on ring opening of the epoxide group. If the (meth)acryloyl-functional epoxides are to contain isocyanate groups, the hydroxyl groups present may be reacted with excess polyisocyanates, preferably diisocyanates.

The (meth)acryloyl-functional compounds suitable for component A) described above may each be used individually or in combination. Care must, however, be taken to ensure that the various components contain no mutually reactive functional groups.

Component B) of the coating compositions according to the invention in principle comprises the same binders having free-radically polymerisable double bonds, preferably in the form of (meth)acryloyl groups, as have been described above for component A). The difference is, however, that the further functional groups reactive for the purposes of an addition and/or condensation reaction of these binders are complementary to or reactive with the groups of component A) which are reactive for the purposes of an addition and/or condensation reaction, but are not reactive towards the groups having free-radically polymerisable double bonds.

Components A), B) and C) may, for example, be functionalised such that, in addition to the radiation-curing crosslinking mechanism, a crosslinking reaction is made possible between OH/NCO, blocked amine/NCO, blocked amine/epoxide group, carboxyl/epoxide group and/or OH/anhydride group. A crosslinking mechanism between hydroxyl and isocyanate groups is preferred.

Particularly preferred components A) are accordingly (meth)acryloyl-functional polyurethanes, poly(meth)acrylates, polyesters and/or polyepoxides containing hydroxyl groups. Particularly preferred components B) are then (meth)acryloyl-functional polyurethanes, poly(meth)acrylates, polyesters and polyepoxides containing isocyanate groups.

One example of a particularly preferred combination of component A) and component B) is present when (meth)acryloyl- and hydroxy-functional poly(meth)acrylates, polyurethanes and/or polyepoxides are used as component A) and NCO-functional urethane compounds prepared from polyisocyanates and hydroxy-functional (meth)acrylic acid esters are used as component B).

The acryloyl-functional free-radically polymerisable polymers and oligomers of components A) and B) may be present in combination with free-radically polymerisable reactive diluents, i.e. reactive polymerisable liquid monomers. The reactive diluents are generally used in quantities of 1 to 50 wt. %, preferably of 5 to 30 wt. %, relative to the total weight of polymer and oligomer and reactive diluent. The reactive diluents may be mono-, di- or polyunsaturated. Examples of monounsaturated reactive diluents are: (meth)acrylic acid and the esters thereof, maleic acid and the semi-esters thereof, vinyl acetate, vinyl ethers, substituted vinyl ureas, styrene, vinyltoluene. Examples of diunsaturated reactive diluents are: di(meth)acrylates such as alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of polyunsaturated reactive diluents are: glycerol tri(meth)acrylate, trimethylolpropane tri(meth)acrylate, pentaerythritol tri(meth)acrylate, pentaerythritol tetra(meth)acrylate. The reactive diluents may be used individually or as a mixture. Diacrylates, such as for example dipropylene glycol diacrylate, tripropylene glycol diacrylate and/or hexanediol diacrylate are preferably used as reactive diluents.

The acryloyl-functional free-radically polymerisable polymers and oligomers of components A) and B) may optionally also be used in combination with further oligomeric and/or polymeric binders which contain no further functional groups and are exclusively curable by free-radical polymerisation by means of high-energy radiation. These preferably comprise conventional radiation-curable polyesters, polyurethanes, poly(meth)acrylates and epoxide and melamine resins having free-radically polymerisable double bonds.

Component C) may optionally be present in the coating compositions according to the invention.

Component C) of the coating compositions according to the invention comprises compounds which contain functional groups which react in an addition and/or condensation reaction with the functional reactive groups of component A) or B), but not with the (meth)acryloyl groups which are present. Functional groups which may be considered are hydroxyl, isocyanate, blocked amino, carboxyl, anhydride and/or epoxide groups. Preferably, however, they comprise hydroxyl or isocyanate groups.

The component C) compounds may be of various natures. They may comprise relatively high molecular weight or low molecular weight compounds. Conventional polyester polyols, poly(meth)acrylate polyols, polycarbonate polyols, polyurethane polyols and/or polyesterurethane polyols usable in the lacquer sector may, for example, be considered. Low molecular weight, polyhydric alcohols having a molecular weight of for example 60 to 400 may, however, also be used.

Further compounds which may be used as component C) are polyisocyanates. The polyisocyanate component may comprise any desired organic polyisocyanates having aliphatically, cycloaliphatically, araliphatically and/or aromatically attached free isocyanate groups. They are liquid at room temperature or liquefied by addition of organic solvents. The polyisocyanates generally have a viscosity at 23° C. of 1 to 6000 mPas, preferably of above 5 and below 3000 mPas.

The polyisocyanates preferably comprise polyisocyanates or polyisocyanate mixtures having exclusively aliphatically and/or cycloaliphatically attached isocyanate groups with an average NCO functionality of 1.5 to 5, preferably of 2 to 3.

Particularly suitable are, for example, "lacquer polyisocyanates" based on hexamethylene diisocyanates, 1-isocyanato-3,3,5-trimethyl-5-isocyanatomethylcyclohexane (IPDI) and/or bis(isocyanatocyclohexyl)methane and the per se known derivatives of these diisocyanates containing biuret, allophanate, urethane and/or isocyanurate groups, from which the excess starting diisocyanate has been removed, preferably by distillation, down to a residual content of less than 0.5 wt. % after the production thereof.

Sterically hindered polyisocyanates, such as for example 1,1,6,6-tetramethylhexamethylene diisocyanate, 1,5-dibutylpentamethyl diisocyanate, p- or m-tetramethylxylylene diisocyanate and the corresponding hydrogenated homologues are also highly suitable. These diisocyanates may also be reacted in a suitable manner to yield more highly functional compounds, for example by trimerisation or by reaction with water or trimethylolpropane.

Aromatic polyisocyanates are also suitable, but less preferred. Examples of these are polyisocyanates based on 2,4-diisocyanatotoluene or the mixtures thereof with 2,6-diisocyanatotoluene or based on 4,4'-diisocyanatodiphenylmethane as well as the trimers thereof.

Further compounds which may be used as component C) are polyepoxides, for example aromatic epoxides based on bisphenol A, but also glycidyl-functional polymers, such as for example glycidyl-functional poly(meth)acrylates.

Blocked polyamines, for example poly- and/or diamines blocked with ketones or aldehydes, are furthermore suitable as component C).

Carboxy-functional polyesters, polyurethanes and/or poly(meth)acrylates as well as polyfunctional carboxylic acids are also suitable as component C).

The quantities of component A) and component B) may vary within broad limits. They may, for example, be present in a ratio of 10:90 to 90:10, preferably of 30:70 to 70:30. These figures relate to the solids content of component A) and component B). Care must be taken to ensure that the functional groups of component A) and component B) are present in such a number that in each case there is an equivalent ratio of OH:NCO, blocked amino group:NCO, blocked amino group:epoxide group, carboxyl group:epoxide group and OH:anhydride group of 1:4 to 4:1, preferably of 1:2 to 2:1. If component C) is also used, the functional groups thereof must be included appropriately.

The coating compositions according to the invention may be based on water or solvents. If the coating compositions are aqueous, steps must be taken to ensure that the binders are dilutable in water. Emulsifiers, particularly preferably nonionic emulsifiers, are preferably used to achieve sufficient dilutability in water.

The coating compositions according to the invention curable under the action of radiation contain photoinitiators. The action of high-energy radiation on the photoinitiators generates free radicals, which then initiate the crosslinking reaction. Suitable photoinitiators are, for example, those which absorb within the wavelength range from 190 to 600 nm.

Examples of photoinitiators for free-radically curing systems are benzoin and derivatives thereof, acetophenone and derivatives thereof, such as for example 2,2,-diacetoxyacetophenone, benzophenone and derivatives thereof, thioxanthone and derivatives thereof, anthraquinone, 1-benzoylcyclohexanol, organophosphorus compounds, such as for example acylphosphine oxides. The photoinitiators are, for example, used in quantities of 0.1 to 7 wt. %, preferably of 0.5 to 5 wt. %, relative to the sum of free-radically polymerisable prepolymers, reactive diluents and photoinitiators. The photoinitiators may be used individually or in combination. Further synergistic components, for example tertiary amines, may moreover be used.

The coating compositions according to the invention may contain additional components conventional for lacquer formulation. They may, for example, contain conventional lacquer additives. The additives comprise the conventional additives used in the lacquer sector. Examples of such additives are levelling agents, for example based on (meth)acrylic homopolymers or silicone oils, anticratering agents, antifoaming agents, catalysts, coupling agents, rheological additives, thickeners, light stabilisers. The additives are used in the conventional quantities familiar to the person skilled in the art.

The coating compositions according to the invention may contain organic solvents and/or water. The solvents comprise conventional lacquer solvents. These may originate from the production of the binders or are added separately. Examples of such solvents are mono- or polyhydric alcohols, for example propanol, butanol, hexanol; glycol ethers or esters, for example diethylene glycol dialkyl ethers, dipropylene glycol dialkyl ethers, in each case with C1 to C6 alkyl, ethoxypropanol, ethylene glycol monobutyl ether; glycols, such as for example ethylene glycol, propylene glycol and the oligomers thereof, esters, such as for example butyl acetate and amyl acetate, N-methylpyrrolidone as well as ketones, for example methyl ethyl ketone, acetone, cyclohexanone; aromatic or aliphatic hydrocarbons, for example toluene, xylene or linear or branched aliphatic C6–C12 hydrocarbons. When NCO-functional binders are used, solvents containing no active hydrogen atoms should preferably be used.

The coating compositions according to the invention may contain pigments and/or extenders. These are the conventional extenders and organic or inorganic colouring and/or effect pigments and anticorrosion pigments usable in the lacquer industry. Examples of inorganic or organic colouring pigments are titanium dioxide, micronised titanium dioxide, iron oxide pigments, carbon black, azo pigments, phthalocyanine pigments, quinacridone and pyrrolopyrrole pigments. Examples of effect pigments are: metal pigments, for example made from aluminium, copper or other metals; interference pigments, such as for example metal oxide coated metal pigments, for example titanium dioxide coated or mixed oxide coated aluminium, coated mica, such as for example titanium dioxide coated mica and graphite effect pigments. Examples of extenders are silicon dioxide, aluminium silicate, barium sulfate and talcum.

Apart from the conventional additives, the coating compositions according to the invention may advantageously also contain special coated transparent extenders to increase scratch resistance. Extenders which may be considered here are, for example, micronised aluminium oxide or micronised silicon oxides. These transparent extenders are coated with compounds which contain UV-curable groups, for example with acrylic-functional silanes, and thus participate in the radiation curing of the clear laquer. The extenders are commercially available, for example under the name AKTISIL®.

The coating compositions according to the invention are used for the production of multilayer lacquer coatings in the automotive lacquer coating sector, in particular in the automotive repair lacquer coating sector. This invention accordingly also relates to the use of the coating compositions in a process for the production of a multilayer lacquer coating. The coating compositions may be used in this case as a surfacer, base lacquer, clear lacquer and/or single layer topcoat lacquer. Preferably, they are used as a surfacer, clear lacquer or as a pigmented single layer topcoat lacquer.

In the coating compositions according to the invention, it is necessary that component A) and component B) are stored separately in order to suppress a premature crosslinking reaction. Depending upon the nature of its reactive groups, component C) may be stored together with component A) or component B). Only shortly before application are the separately stored components thoroughly mixed together, optionally with pigments, extenders and conventional lacquer additives. A spraying viscosity may then optionally additionally be established with organic solvents and/or water.

The coating compositions according to the invention may be applied onto optionally precoated substrates using a multilayer lacquer coating process. Preferred substrates are metal or plastic substrates. The substrates may be coated with conventional priming or further interlayers, as are used for multilayer lacquer coating in the automotive sector. The multilayer structure is applied using conventional methods, preferably by spraying. In the case of very small areas of damage, the lacquer according to the invention may be applied by stippling.

The coating compositions according to the invention may be cured, on the one hand, by means of high-energy radiation, preferably by means of UV radiation. Preferred UV radiation sources are those which emit in the wavelength range from 180 to 420 nm, in particular from 200 to 400 nm. Examples of such UV radiation sources are optionally doped high, medium and low pressure mercury vapour light sources, gas discharge tubes, such as for example low pressure xenon lamps, pulsed and unpulsed UV lasers, point sources of UV light, such as for example UV-emitting diodes and black light tubes. Irradiation is preferably performed with pulsed UV radiation. In this case, so-called high-energy electron flash devices (also known as UV flash lamps) are particularly preferably used as the radiation source.

Preferred UV flash lamps emit light of a wavelength of 200 to 900 nm. The UV flash lamps preferably contain a plurality of flash tubes, for example quartz tubes filled with an inert gas, such as xenon. The UV flash lamps should create a luminous intensity on the surface of the coating to be cured of at least 10 megalux, preferably of 10 to 80 megalux per flash discharge. The energy output per flash discharge should preferably be 1 to 10 kjoules. The UV flash lamps are preferably transportable devices, which may be positioned directly in front of the area of damage to be repaired. Depending upon circumstances, one or more UV flash lamps may be used. UV flash lamps which may be used are, for example, described in WO-A-9411123 and in EP-A-525 340. UV flash lamps are commercially available.

Drying or curing of the applied coating compositions may be achieved by a plurality of successive flash discharges. Preferably, 1 to 40 successive flash discharges are triggered. Depending upon the type and power of the lamp, the distance between the UV flash lamp and the substrate surface to be irradiated may be, for example, 5–70 cm. Screening of the UV lamps in order to avoid the escape of radiation may be achieved, for example, by using an appropriately lined protective housing around the transportable lamp unit or by other safety measures known to the person skilled in the art.

The overall duration of irradiation is in the range of a few seconds, for example in the range from 1 millisecond to 600 seconds, preferably from 4 to 320 seconds, depending upon the selected number of flash discharges. The flashes may be triggered, for example, every 4 seconds. The UV flash lamps are immediately ready for use at any time, i.e. they require no warm-up time and may be switched off between two curing or irradiation operations separated by a certain interval of time without having to waste time waiting during the warm-up phase for the next irradiation operation.

When the coatings are irradiated by UV radiation, in particular with UV flash lamps, the temperatures produced on the coating are generally such that they may already give rise to curing or partial curing by means of the additional crosslinking mechanism.

After the irradiation operation, the coating compositions may be cured by the additional crosslinking mechanism by leaving the coatings to cure completely at room temperature, for example for 16–24 hours. It is, however, also possible to perform the complete curing at higher temperatures of, for example, 30 to 120° C., preferably of 40 to 80° C. Complete curing may proceed using conventional methods, for example in a heated booth or by IR radiation. Depending upon the curing temperature, curing times of, for example, 10 to 60 minutes are possible.

If the coating compositions according to the invention are used as surfacers, they may be applied onto already pre-coated or pretreated substrates, but they may also be applied onto existing lacquer coatings. They may be applied, for example, onto conventional solvent- or water-based fillers, primers, coupling primers or further interlayers as are conventional for automotive lacquer coating.

If the coating compositions according to the invention are used as clear lacquers in a multilayer structure, the clear lacquer may be applied onto a solvent- or water-based base lacquer.

If the coating compositions according to the invention are used as a pigmented topcoat lacquer, they may be applied onto conventional water- or solvent-based surfacer layers.

Depending upon the particular application, a flashing-off period of for example 5–60 minutes may then follow. The selected time is determined, for example, by the lacquer system (solvent-based or aqueous) and by the layer thickness. After flashing-off, irradiation with UV radiation is performed and the further hardening described above may follow.

In a multilayer structure, the coating compositions according to the invention may be used solely for only one surfacer, base lacquer, clear lacquer and topcoat layer. They may, however, simultaneously be used in a multilayer structure for two or more different lacquer layers. Radiation curing of the individual layer may here be performed each at a different radiation intensity and different duration of irradiation and for a different number of flash discharges for each layer individually or for two or more layers together. In the latter case, brief interim curing may optionally be performed, for example interim curing with 1 to 2 flash discharges.

The coating compositions according to the invention yield coatings having elevated scratch resistance and very good resistance to chemicals, petrol and solvents. The coatings exhibit no cracking, from which it may be concluded that curing is uniform throughout. Interlayer adhesion is very good, in particular the adhesion of clear lacquers according to the invention to conventional and water-based lacquers.

The coating compositions according to the invention may advantageously be used in automotive lacquer coatings, in particular in automotive repair lacquer coating, for example for the repair of automotive components, relatively small areas of damage and for spot repair. They may, however, also be used for repairs in automotive original lacquer coating.

What is claimed is:

1. A coating composition which is curable by means of high-energy radiation, comprising:
   A) oligomeric or polymeric compounds having a number average molecular weight of 300 to 1000, one or more free-radically polymerizable double bonds, and at least one further functional group reactive in a reaction selected from the group consisting of an addition reaction and a condensation reaction,
   B) oligomeric or polymeric compounds having a number average molecular weight of 300 to 1000, one or more free-radically polymerizable double bonds, and at least one additional functional group reactive in a reaction selected from the group consisting of an addition reaction and a condensation reaction, wherein the additional reactive functional group is complementary to or reactive towards the further reactive functional groups of component A),
   C) at least one compound selected from the group consisting of monomeric, oligomeric, and polymeric compounds having at least one functional group reactive for the purposes of a reaction selected from the group consisting of an addition reaction and a condensation reaction with the functional groups from component A) or component B),
   D) one or more photoinitiators as well as
   E) optionally, at least one of solvents, water, pigments, extenders and conventional lacquer additives,
   wherein component A) and component B) differ from each other and component C) contains no free-radically polymerizable double bonds.

2. A coating composition according to claim 1, wherein at least one of component A) and B) compounds are (meth) acryloyl-functional compounds based on one or more compounds selected from the group consisting of poly(meth) acrylate, polyurethane, polyester, polyesterurethane and epoxy resin having a number average molecular weight of 800 to 10000, wherein each molecule contains at least two polymerizable double bonds in the form of (meth)acryloyl groups.

3. A coating composition according to claim 1, wherein components A), B) and C) are functionalized in such a manner that, in addition to the radiation curing, the components are also crosslinked by a reaction between at least one pair of complimentary functional groups selected from the group consisting of a hydroxy group and an isocyanate group, a blocked amine and an isocyanate group, a blocked amine and an epoxide group, a carboxyl and an epoxide group and a hydroxy group and an anhydride group, wherein the ratio of these groups relative to each other is 1:4 to 4:1.

4. A coating composition according to claim 1, wherein the component A) compounds are selected from the group consisting of (meth)acryloyl-functional polyurethanes, poly (meth)acrylates, polyesters and polyepoxides containing hydroxyl groups with OH values of 20–200 mg of KOH/g and the component B) compounds are selected from the group consisting of (meth)acryloyl-functional polyurethanes, poly(meth)acrylates, polyesters and polyepoxides containing isocyanate groups with an NCO content of 2–30 wt. %.

5. A coating composition according to claim 1, wherein components A) and B) are present in combination with free-radically polymerizable reactive diluents, and wherein the quantity of reactive diluent amounts to 1 to 50 wt. %, relative to the total weight of the polymer and oligomer and reactive diluent.

6. A coating composition according to claim 1, wherein the component C) compounds are polyisocyanates having a viscosity of 1 to 6000 mPas and an average NCO functionality of 1.5 to 5.

7. A coating composition according to claim 1, wherein the component C) compounds are selected from the group consisting of polyester, poly(meth)acrylate, polyurethane and polycarbonate polyols having an OH value of 20–250 mg of KOH/g.

8. A method for using the coating compositions according to claim 1 in a process for the production of multilayer lacquer coatings, comprising:
applying a said coating composition as at least one member selected from the group consisting of a surfacer, base lacquer, clear lacquer and pigmented single layer topcoat lacquer.

9. A method for using the coating compositions according to claim 1, comprising:
applying at least one of the coating compositions for automotive repair lacquer coating.

* * * * *

UNITED STATES PATENT AND TRADEMARK OFFICE
CERTIFICATE OF CORRECTION

PATENT NO. : 6,332,291 B1
DATED : December 25, 2001
INVENTOR(S) : Flosbach et al.

It is certified that error appears in the above-identified patent and that said Letters Patent is hereby corrected as shown below:

Column 11,
Line 51, please delete "1000" and insert -- 10000 --.
Line 57, please delete "1000" and insert -- 10000 --.

Signed and Sealed this

Twenty-second Day of October, 2002

Attest:

Attesting Officer

JAMES E. ROGAN
Director of the United States Patent and Trademark Office